(12) United States Patent
Kari

(10) Patent No.: US 12,432,391 B2
(45) Date of Patent: Sep. 30, 2025

(54) SYSTEM AND METHOD FOR DISTRIBUTING MUSICAL PERFORMANCE

(71) Applicant: Pauli Kari, Turku (FI)

(72) Inventor: Pauli Kari, Turku (FI)

(73) Assignee: Pauli Kari, Turku (FI)

(*) Notice: Subject to any disclaimer, the term of this patent is extended or adjusted under 35 U.S.C. 154(b) by 142 days.

(21) Appl. No.: 15/734,016

(22) PCT Filed: Feb. 15, 2019

(86) PCT No.: PCT/FI2019/050120
§ 371 (c)(1),
(2) Date: Dec. 1, 2020

(87) PCT Pub. No.: WO2019/229291
PCT Pub. Date: Dec. 5, 2019

(65) Prior Publication Data
US 2021/0227265 A1    Jul. 22, 2021

(30) Foreign Application Priority Data

Jun. 1, 2018    (FI) ..................................... 20180090

(51) Int. Cl.
*H04N 21/218*  (2011.01)
*G06T 19/00*   (2011.01)
(Continued)

(52) U.S. Cl.
CPC ..... *H04N 21/21805* (2013.01); *G06T 19/006* (2013.01); *H04N 21/2187* (2013.01);
(Continued)

(58) Field of Classification Search
CPC .................. G06T 19/006; H04N 21/21805
See application file for complete search history.

(56) References Cited

U.S. PATENT DOCUMENTS

| | | | |
|---|---|---|---|
| 8,179,604 B1 | 5/2012 | Prada Gomez et al. | |
| 2012/0287040 A1* | 11/2012 | Moore ................... | G02B 27/01 345/157 |

(Continued)

FOREIGN PATENT DOCUMENTS

| | | |
|---|---|---|
| CN | 201278213 Y | 7/2009 |
| CN | 104698890 A | 6/2015 |

(Continued)

OTHER PUBLICATIONS

International Search Report and Written Opinion of the International Searching Authority, issued in PCT/FI2019/050120, mailed May 14, 2019; ISA/FI.

(Continued)

*Primary Examiner* — Clifford Hilaire
(74) *Attorney, Agent, or Firm* — Harness, Dickey & Pierce, P.L.C.

(57) ABSTRACT

The invention relates more particularly to a system (1) for distributing musical performance directed at neurotrauma patients, which comprises means (10) for sending a musical performance via a data network (8), wherein the musical performance is a 360-degree video transmission and comprises an audio track. The system further comprises means (9) for receiving the musical performance and means (5) for presenting the musical performance, wherein the means (5) for presenting the musical performance are VR (Virtual Reality) glasses that are adapted to be placed on the patient. The system is adapted to reproduce the 360-degree video transmission for the patient via the VR glasses (5) placed on the patient in such a way that the patient can participate virtually in the musical performance regardless of his/her location.

6 Claims, 3 Drawing Sheets

(51) Int. Cl.
*H04N 21/2187* (2011.01)
*H04N 21/422* (2011.01)
*H04N 21/4728* (2011.01)
*H04N 21/4788* (2011.01)
*H04N 21/6587* (2011.01)

(52) U.S. Cl.
CPC ... *H04N 21/42204* (2013.01); *H04N 21/4728* (2013.01); *H04N 21/4788* (2013.01); *H04N 21/6587* (2013.01)

(56) References Cited

U.S. PATENT DOCUMENTS

| | | |
|---|---|---|
| 2016/0050212 A1 | 2/2016 | Etter et al. |
| 2016/0086379 A1* | 3/2016 | Sadi ............... G02B 27/0093 345/633 |
| 2016/0092732 A1* | 3/2016 | Black .................. G06F 18/22 382/103 |
| 2017/0221465 A1 | 8/2017 | Piccionelli |
| 2017/0318275 A1 | 11/2017 | Khalid et al. |
| 2017/0318325 A1 | 11/2017 | Ortiz et al. |
| 2018/0035136 A1 | 2/2018 | Crowe |
| 2018/0054611 A1 | 2/2018 | Shin |
| 2018/0077210 A1 | 3/2018 | Hannuksela et al. |
| 2018/0310037 A1* | 10/2018 | Pizzurro .......... H04N 21/23412 |
| 2021/0227265 A1 | 7/2021 | Kari |

FOREIGN PATENT DOCUMENTS

| | | |
|---|---|---|
| CN | 106210828 A | 12/2016 |
| EP | 3327548 A1 | 5/2018 |
| FI | 12136 U1 | 9/2018 |
| TW | 200830151 A | 7/2008 |
| WO | WO-201705642 A1 | 1/2017 |

OTHER PUBLICATIONS

International Preliminary Report on Patentability issued in PCT/FI2019/050120, mailed Aug. 28, 2020.

Office Action for corresponding Chinese patent application No. 201980037343.6 dated Feb. 7, 2022, with English translation, 13 pages.

Extended European Search Report for corresponding European patent application No. 19812565.0 dated Mar. 15, 2022, eight pages.

Canadian Office Action in application No. 3,102,146 issued on Feb. 12, 2025.

\* cited by examiner

SYSTEM AND METHOD FOR DISTRIBUTING MUSICAL PERFORMANCE

CROSS-REFERENCE TO RELATED APPLICATIONS

This application is a 371 U.S. National Phase of International Application No. PCT/FI2019/050120, filed Feb. 15, 2019, which claims priority to Finnish Patent Application No. U20180090, filed Jun. 1, 2018. The entire disclosures of the above applications are incorporated herein by reference.

BACKGROUND OF THE INVENTION

The object of the present invention is a system for distributing musical performance directed more particularly at neurotrauma patients.

BACKGROUND OF THE INVENTION

It has been known in neurology since the end of the 1800s that an injury in the brain can bring about permanent and serious disruption in the perception or production of music, i.e. amusia. In most cases the background to amusia is injury, in particular in the temporal lobe of the right cerebral hemisphere or in the lower part of the frontal lobe. In a healthy brain, a very extensive neural network comprising many temple areas, forehead areas and parietal lobe areas and spreading to both cerebral hemispheres, as well as comprising deep limbic brain areas, participate in the processing of music. Alongside processing the acoustic features and structure of music, this network regulates many cognitive functions, such as attentiveness and memory, as well as motor functions and emotions. Music is therefore a very complex and diverse stimulus for the brain.

Music can also be used in neurological rehabilitation. In cerebral palsy patients, music-based rehabilitation methods, which utilize the rhythm, melody and emotive effect of music, have been successfully used in rehabilitating motor functions and speech as well as in the treatment of affective disorders. In dementia cases, such as Alzheimer's disease, the emotional and cognitive effect of music often lasts for a long time as the disease progresses and the pattern of cognitive symptoms worsens. By means of musicotherapy, the neuropsychiatric symptoms of mental illnesses such as anxiety and depression, can be alleviated.

Injuries following a cerebral hemorrhage are widely treated using specific multiprofessional forms of rehabilitation therapy, e.g. speech therapy, occupational therapy, physiotherapy and neuropsychological rehabilitation. The goal is to reduce injuries following a cerebral hemorrhage or trauma and to assist rehabilitating activity depending on the plasticity of the neural networks of the brain, thereby returning the patient's ability to function as much as possible. The forms of rehabilitation in question necessitate the presence of nursing staff and/or the admission of the patient to a rehabilitation center.

BRIEF DESCRIPTION OF THE INVENTION

The solution according to the invention enables a system for distributing musical performance directed more particularly at neurotrauma patients, which system can function interactively between a concert hall and the location of the patient, with sound, with a video image and with an electronic communication system in such a way that the patient can participate in the performance regardless of his/her location. Patients around the world can interactively participate in a centralized concert. In one embodiment of the invention, the system can be one functioning in real-time.

The video production to be used in a live broadcast of a musical performance, or to be recorded, is filmed and transmitted, preferably as a 360-degree image and as stereophonic sound, in such a way that the patient follows the performance wearing VR (Virtual Reality) glasses, giving the therapist for the treatment method a better chance for an effect.

A patient can communicate with a musician playing in a concert hall by using social media tools. The user interfaces for the social media to be used for communication with the patient are integrated into the VR glasses. Chat, or some other communication tool, is connectable to the user interface of the VR glasses, with which tool the patient can comment or engage in conversation e.g. with people at the concert.

The sound reproduction used by the patient adapts itself to the image in such a way that when using the VR glasses the sound also turns around its own axis stereophonically, or using psychoacoustic effects, in relation to the image. This sound reproduction can be headphones or separate loudspeakers that are installed in the close proximity of the patient.

The transmission is preferably a multiple-camera setup, either pre-programmed or programmed by the patient himself/herself. It has been ascertained that when a patient can follow the playing of music from the perspective of the musician, the therapy has a more effective and faster effect. The patient can be supplied with a pre-programmed multiple-camera setup image or he/she can himself/herself select from the user interface which camera image to watch.

The system according to the invention can also comprise means for sending a musical performance via a data network, wherein the musical performance is a 360-degree video transmission and comprises an audio track. The system can further comprise means for receiving the musical performance and means for presenting the musical performance, wherein the means for presenting the musical performance are VR (Virtual Reality) glasses that are adapted to be placed on the head of the patient. The system is adapted to reproduce the 360-degree video transmission for the patient via the VR glasses placed on the patient in such a way that the patient can participate virtually in the musical performance regardless of their location.

One advantage of the invention is access for a cerebral hemorrhage patient or brain trauma patient to rehabilitating musicotherapy regardless of the location of the patient and also without outside assistance and/or rehabilitation personnel. Easy availability of musicotherapy also enables the provision of continuous and frequently repeatable rehabilitation, which in turn assists the return of the ability to function and thereby the subsequent ability of the patient to cope with everyday tasks. The rehabilitation can be produced centrally, which enables the participation of different patients regardless of their location.

Musicotherapy has been shown (Sarkamo et al. 2008) to bestow effects promoting functioning ability, especially during the period of time immediately following a cerebral hemorrhage or brain injury, when the neural networks of the brain are at their most sensitive to external stimuli. In addition to furthering the development of physical functioning ability, frequently repeated musicotherapy during this dynamic period of time also has favorable long-term effects on cognitive and emotional functions in cerebral hemorrhage patients or brain trauma patients.

BRIEF DESCRIPTION OF THE FIGURES

In the following, the invention will be described in more detail by the aid of some embodiments with reference to the drawings 1-3, wherein.

DETAILED DESCRIPTION OF THE INVENTION

Figure 1:
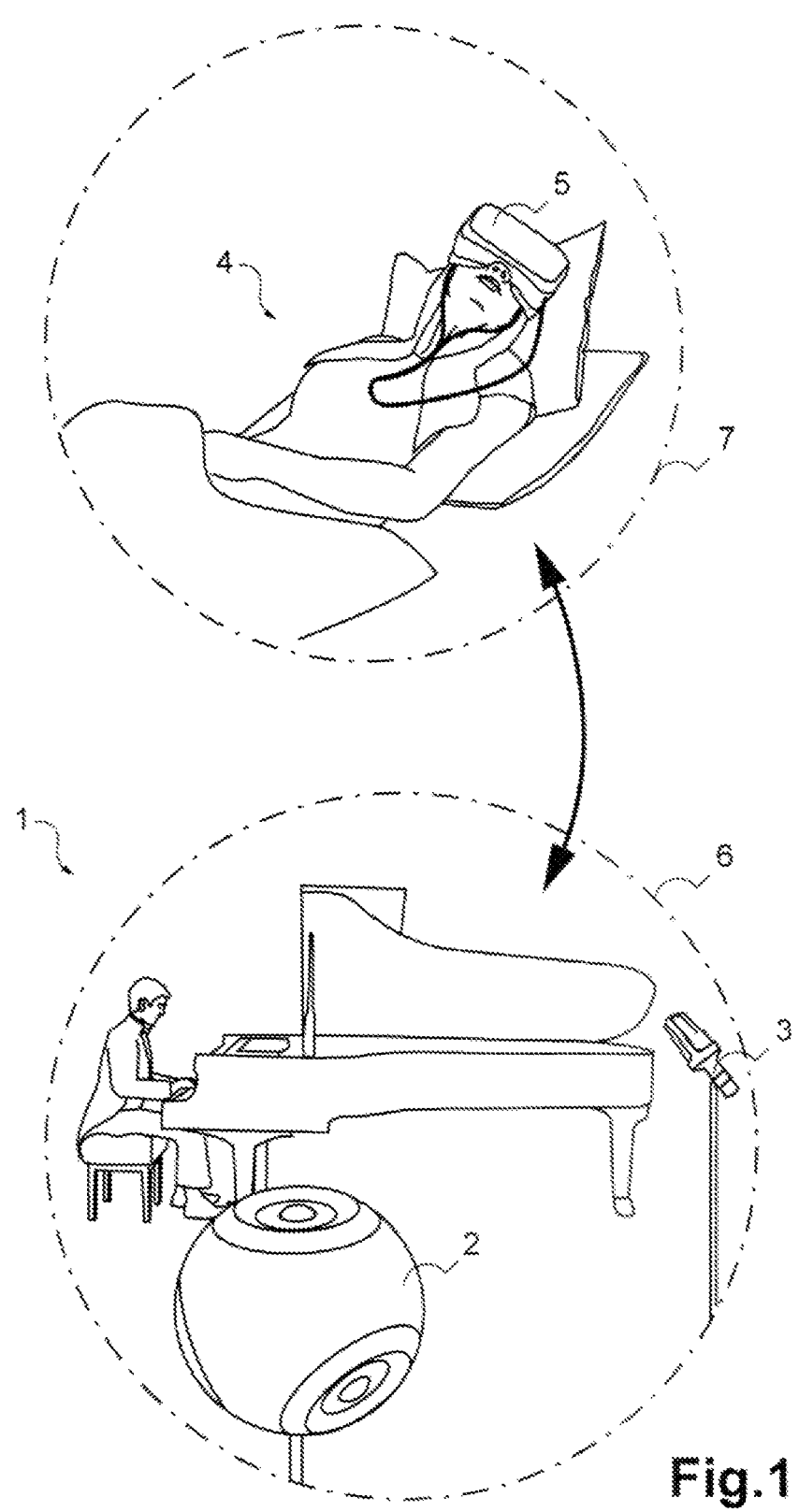
FIG. 1 presents a solution according to one embodiment of the invention.

FIG. 1 describes an operating environment in which the solution according to the invention can be used. In a space in which a musical performance is recorded, the video production can occur with at least one 360-degree camera 2 and with a stereo microphone 3, after which the video can be broadcast live and/or recorded as a 360-degree image and stereophonic sound. A patient 4 utilizing the system of the invention can follow a concert wearing Virtual Reality (VR) glasses 5. The treatment method implemented by means of the system functions between a space, such as a concert hall 6, and the location of the patient 7, with sound and a video image.

Figure 2:
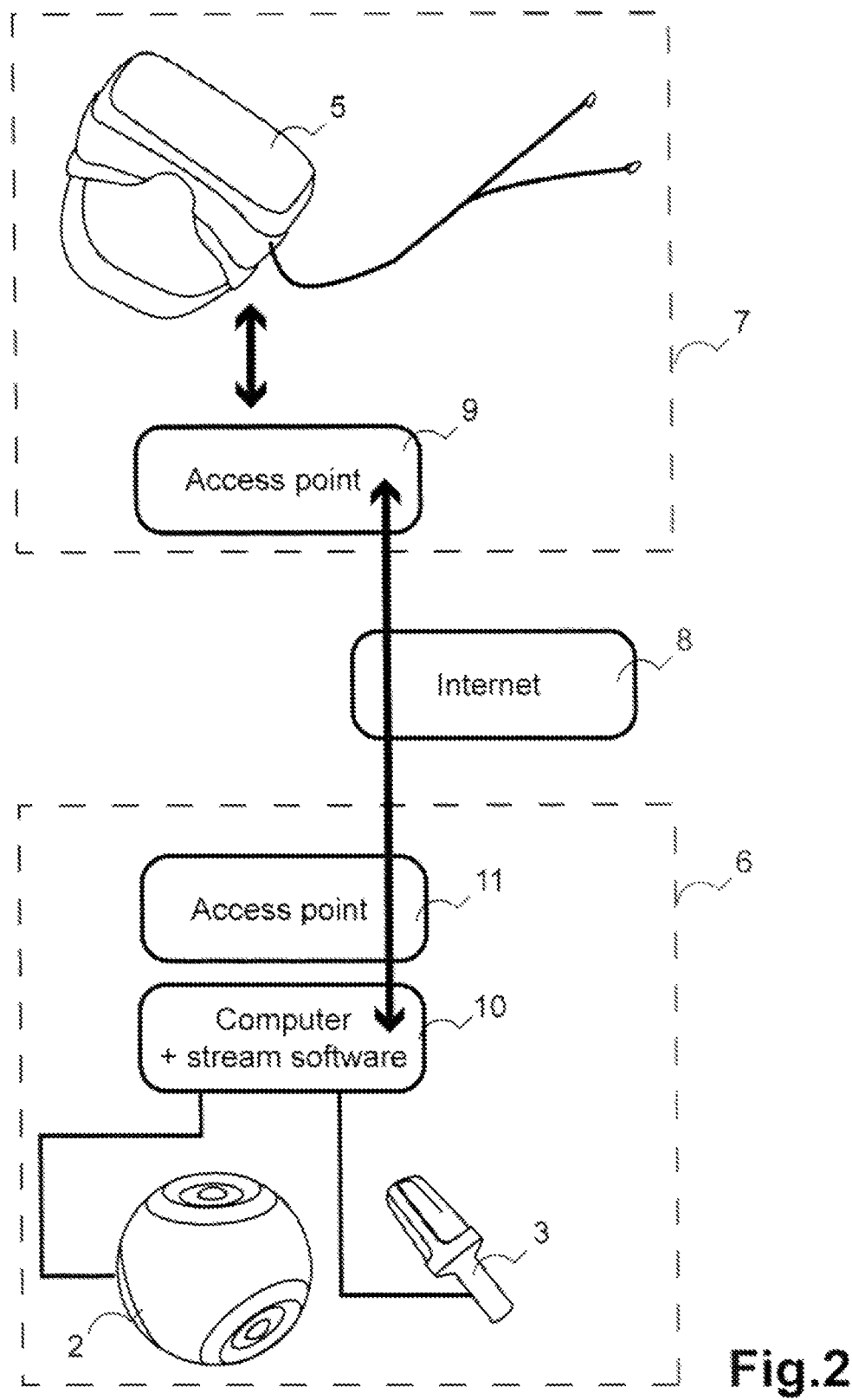
FIG. 2 presents a solution according to one embodiment of the invention and the components of the system.

FIG. 2 presents a solution according to one embodiment of the invention and the components of the system. The patient has VR glasses 5 at his/her disposal. These are connected to the internet 8 via an access point 9. The 360-degree image and also the sound are transmitted from the concert hall 6. The production computer 10 is connected to the internet 8 via an access point 11, via which the production is sent to a patient at his/her location 7. The production computer can be a server.

Figure 3:
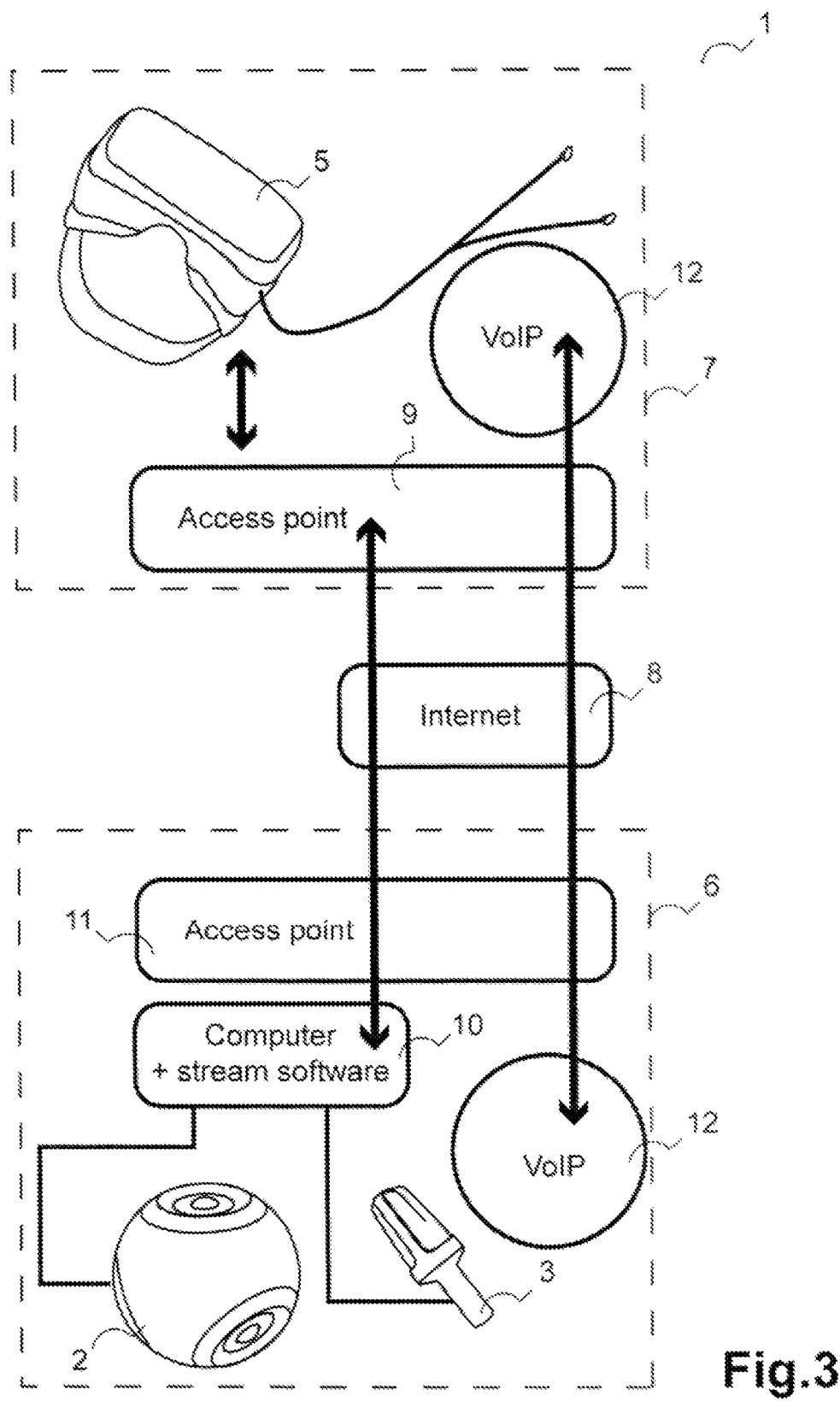
FIG. 3 presents a solution according to a second embodiment of the invention and the components of the system.

The embodiment presented in FIG. 3 otherwise corresponds to the embodiment of FIG. 2 but in the embodiment of FIG. 3 the patient can communicate with a musician playing in a concert hall 6. The treatment method implemented by means of the system in this case functions interactively between a space, such as a concert hall 6, and the location of the patient 7, with the sound and video image of a live broadcast as well as with VOIP (Voice over IP) 12 in such a way that the patient can participate in the concert regardless of his/her location.

In the system of the embodiments described above, a musical performance can be recorded in the system, e.g. on a server of the system, and Virtual Reality glasses can acquire the pre-recorded performance from the server and present it in the VR glasses. The presentation can also be recorded on a memory means that can be fitted into VR glasses or that can be adapted to VR glasses. In such a case, it is sufficient that the performance is recorded in the memory means of the system and patients can later watch the performance from the VR glasses at the desired time. In one embodiment of the invention, the transmission can be sent as a live broadcast to the desired glasses and, in addition to this, recorded in the system for later use.

In one embodiment of the invention, The VR glasses comprise a data processing apparatus that is adapted to directly download and present a 360-degree video transmission without the need for a separate computer that would perform the presentation of the videos on the VR glasses connected to it.

In one embodiment of the invention, the VR glasses function as an independent data processing device and do not require the use of an external computer. The glasses can make a connection via a wireless or wired network and, via this, present a concert on the server or a concert broadcast transmitted as a live broadcast. The glasses can also present a musical performance recorded in the glasses and/or in memory means connected to them, e.g. an audio & video feed.

In one embodiment of the invention, the VR glasses are adjustable so that they can be placed on the head of a user in the best possible position. The adjustability can be implemented e.g. with different nose supports of different sizes. In this way the viewing experience can be made as genuine as possible and the patient rehabilitates as effectively as possible.

In one embodiment of the invention, the space in which a musical performance is recorded can be e.g. an indoor space, an outdoor space, a concert hall, a home and/or or a festival.

The system according to the invention can also comprise a service platform for content providers and a server for this service, to which server content providers can send material, and via which server customers can use the material of service providers.

The solution according to the invention can comprise a remote control, by means of which a patient can control the glasses. Control of the remote controller can be implemented e.g. with buttons and/or with gesture control. By means of remote control, the user can e.g. select the performance, such as a concert, to watch. By means of remote control, the user can e.g. change the camera and/or the image angle.

In one embodiment of the invention, the remote control can be a ring-like remote control to be placed on a finger. In such a case, a patient can, by moving a finger, see a concert in 360 degrees and/or change the image angle, the camera and/or the image direction by means of a movement of the finger, even though the patient's head remains stationary or must be kept stationary due to the condition of the patient.

It is obvious to the person skilled in the art that the different embodiments of the invention are not limited solely to the examples described above, and that they may therefore be varied within the scope of the claims presented below. The characteristic features possibly presented in the description in conjunction with other characteristic features can also, if necessary, be used separately to each other.

The invention claimed is:

1. A system for distributing musical performance directed at neurotrauma patients for treatment of affected disorders, wherein the system comprises means for sending a musical performance via a data network, wherein the musical performance is a 360-degree video transmission and comprises an audio track; wherein the system further comprises means for receiving the musical performance and means for presenting the musical performance, wherein the means for presenting the musical performance are VR (Virtual Reality) glasses that are adapted to be placed on a head of the neurotrauma patient, wherein the neurotrauma patient wearing the VR glasses remains stationary laying on a hospital bed, and wherein one or more user interfaces for a social media are integrated in the VR glasses by which the neurotrauma patient wearing the VR glasses can communicate with a musician performing the musical performance;

wherein the system is configured to reproduce the 360-degree video transmission for the neurotrauma patient via the VR glasses placed on the neurotrauma patient in such a way that the patient can participate virtually in the musical performance regardless of his/her location;

wherein the musical performance is transmitted to the VR glasses as a real-time live broadcast and the neurotrauma patient can communicate with the musician real-time;

the system further comprises a ring-like remote control to be placed on a finger of the neurotrauma patient, with which the neurotrauma patient is configured to control the VR glasses such, that an image angle of the 360-degree video transmission is changed only by moving the finger so that the head of the neurotrauma patient wearing the VR glasses remains stationary; and the system is configured to adjust a sound reproduction used by the neurotrauma patient to an image in such a way that when using the VR glasses, the sound reproduction turns around its own axis, in relation to the selected musical performance, the selected camera or the selected image angle by the ring-like remote control;

wherein the neurotrauma patient suffers a cerebral hemorrhage or brain trauma and the system is configured to provide an access for a cerebral hemorrhage patient or a brain trauma patient to rehabilitating musicotherapy regardless of the location of the patient during a period of time immediately following the cerebral hemorrhage or the brain injury, and the rehabilitation is configured to be produced centrally, which enables the participation of different patients regardless of their location.

2. System according to claim 1, wherein the system comprises a server that is adapted to send a 360-degree video transmission to VR glasses placed on the patient.

3. System according to claim 1, wherein the VR glasses comprise a data processing apparatus that is adapted to directly download and present a 360-degree video transmission without the need for a separate computer.

4. System according to claim 1, wherein the musical performance is filmed, recorded and/or transmitted as a 360-degree image and in stereophonic sound.

5. System according to claim 1, wherein a transmission of the system is implemented as a multiple-camera setup, either pre-controlled or the system comprises means for selecting the image angle and/or the cameras.

6. The system according to claim 1, wherein the one or more user interfaces for a social media comprises a communication tool with which the patient can engage with people at the musical performance.

* * * * *